United States Patent [19]

Chang

[11] 3,725,113

[45] Apr. 3, 1973

[54] BLOOD COMPATIBLE MICROENCAPSULATED DETOXICANTS AND METHOD FOR MAKING

[75] Inventor: Thomas M. S. Chang, Montreal, Quebec, Canada

[73] Assignee: Research Corporation, New York, N.Y.

[22] Filed: Dec. 17, 1970

[21] Appl. No.: 99,269

[52] U.S. Cl. ................ 117/82, 23/258.5, 117/81, 117/100 B, 117/100 C, 117/165, 424/9, 424/10, 424/35, 424/36, 424/101, 424/125, 424/183
[51] Int. Cl. ..................... A61k 23/02, G01n 31/06
[58] Field of Search ........... 424/36, 35, 125; 117/81, 117/DIG. 11, 82, 100 B

[56] References Cited

UNITED STATES PATENTS 3,522,346   7/1970   Chang ................................ 424/35

OTHER PUBLICATIONS

Chang, T.M.S.: Canadian Journal of Physiol. and Pharmacol., Vol. 47, Pages 1,043–1,045 (1969).
Chang, T.M.S. et al.: Trans. Amer. Soc. Artif. Organs, Vol. 16, Pages 141–148 (1970).

Primary Examiner—Ralph Husack
Attorney—Stowell & Stowell

[57] ABSTRACT

Blood compatible microencapsulated detoxicants suitable for the detoxification of blood in an extracorporeal shunt are made by coating a solid detoxicant with a semipermeable polymer membrane and then coating the membrane with a non-interfering layer of a blood compatible protein.

4 Claims, No Drawings

BLOOD COMPATIBLE MICROENCAPSULATED DETOXICANTS AND METHOD FOR MAKING

This invention relates to microencapsulated detoxicants intended for use in the extracorporeal detoxification of blood.

The first artificial kidney in clinical use operated as extracorporeal hemodialyzers. Permeant metabolites from the blood being detoxified diffused through a semipermeable membrane at a rate proportional to the surface area of the membrane but inversely proportional to its thickness. Much effort has gone into the design and development of simpler, more compact and less costly hemodialysis systems.

Using another approach, T.M.S. Chang, Trans. Amer. Soc. Artif. Int. Organs, 12, 13 (1966) demonstrated the feasibility of utilizing semipermeable microcapsules as artificial kidneys. It was suggested that a compact device could be made by packing semipermeable microcapsules into an extracorporeal shunt through which blood could be perfused. Because of their lesser membrane thickness and relatively larger total surface area as compared to a dialysis membrane, microcapsules could form the basis of a more efficient artificial kidney.

A number of solid absorbents, such as charcoal and ion exchange or chelating resins, can remove waste metabolites, toxins and other undesirable materials from perfusing blood. Activated charcoal in particular is very effective in absorbing many uremic waste metabolites and exogenous toxins. However, charcoal granules in direct contact with blood adversely affect the formed elements present in blood and release free particles into the circulating blood capable of causing emboli in certain major bodily organs.

Chang et al, Can. J. Physiol. Pharmacol., 44,115–128 (1966) and Trans. Amer. Soc. Artif. Int. Organs, 14, 163–168 (1968), reported that embolism-causing particles can be avoided and destruction of formed elements lessened by providing the absorbent as an aqueous slurry in semipermeable microcapsules. The encapsulated absorbent does not come in direct contact with the formed elements of perfusing blood and free particles of absorbent are retained within the microcapsules. Permeant waste metabolites and toxins diffuse through the semipermeable membrane walls defining the microcapsules to be absorbed by the detoxicant and removed from the diffusing blood.

The semipermeable microcapsules described in Chang et al above resemble artificial cells. The cell wall membranes in these microcapsules are flexible and there is a tendency for the microcapsules to close pack increasing their resistance to blood perfusion and occasionally rupture when used in large quantities.

More recently, U.S. Pat. No. 3, 522,346 to Chang describes semipermeable microcapsules made by the direct coating of polymer, together with a heparin-quaternary ammonium complex onto granules of solid detoxicant. The resultant microcapsules are somewhat non-uniform in configuration, generally conforming in shape to that of the granules coated, and resist close packing when used in large quantities; the membrane is less flexible and there is less of a tendency to rupture under stress. The presence of heparin in the membranes renders the microcapsules nonthrombogenic.

I have now discovered improved double coated detoxicant microcapsules even more efficient when used in the extracorporeal detoxification of blood. My novel microcapsules are characterized by having the semipermeable membrane directly coated onto the solid detoxicant followed by a second coating of a blood compatible protein. The outer protein layer substantially avoids any adverse effect on the formed elements present in blood without imparing the efficiency of the microcapsules as blood detoxicants.

More specifically, the present invention is a microencapsulated detoxicant composition adapted for reaction in an extracorporeal shunt with waste metabolites and toxins found in blood comprising a solid detoxicant coated first with a semipermeable polymer membrane having an effective pore size permitting waste metabolites and toxins to diffuse therethrough and second with a permeable outer layer of a blood compatible protein.

The detoxicants contemplated for use in practicing my invention are those solids useful in the removal of waste metabolites and toxins from circulating blood. Various absorbents including ion exchange resins have been used for this purpose. Charcoal, particularly activated charcoal of vegetable origin, is of most general application.

The precise constituents or chemical nature of the polymer utilized to coat the absorbent is not critical. However, the polymer should be capable of being formed into a semipermeable membrane about the granules of absorbent with an effective pore size permitting molecules of waste metabolite to diffuse therethrough to contact the absorbent. It is also apparent that the polymer selected be insoluble in water, capable of sterilization, stable to blood and non-toxic. While the present invention is described with particular reference to collodion, other hydrophilic polymers, particularly cellulosic polymers such as cellulose acetate, cuprophane, cadophane and the like, may be utilized.

The granules of absorbent are most conveniently coated by stirring with a solution of the desired polymer in a voltatile organic solvent. The suspension is slowly stirred until most of the solvent evaporates and the still-wet coated granules spread out and dried under moderate heating. The dried coated granules are repeatedly washed with large volumes of sterile water until free of uncoated absorbent granules and other smaller particles.

The polymer coated microcapsules are generally sterilized prior to final coating with protein as by autoclaving at 121°C and 15 psi. (The absorbent is preferably presterilized prior to coating with polymer). The sterilized microcapsules are then coated with a blood compatible protein, such as albumin or collagen, preferably from sterile aqueous solution. A relatively thin permeable layer of protein is deposited which does not interfere with diffusion through the semipermeable polymer membrane.

The detoxicant microcapsules according to the present invention are non-uniform generally conforming to the shape of the absorbent granules coated. While not round, they approximate spheres about 1 mm in diameter. Membrane thickness is in the range of 100–1,000 A and effective pore size in the range 5–45

A. The microcapsules are permeable to most of the non-protein constituents found in circulating blood.

My invention is further illustrated by means of the following non-limiting examples.

EXAMPLE 1

Preparation of microcapsules

Three hundred grams of 6–14 mesh activated coconut-derived charcoal granules was wrapped in a sterile cloth, autoclaved at 121°C and 15 psi for one hour and allowed to stand in the sealed wrapping for at least 1 day. The charcoal was then placed in a beaker and a solution containing 15 ml of U.S.P. collodion in 300 ml of ether and 15 ml of ethanol was added with stirring. When most of the solvent had evaporated, the slightly wet polymer-coated charcoal was spread out in a large tray and dried for 5 hours at 50°C in a ventilated oven. The dried microcapsules were sieved (40 mesh) with bacteria-free distilled water until free of fine particles.

The washed microcapsules were then placed in a shunt of the type described in Example 3, primed with bacteria-free water and autoclaved for 30 minutes at 121°C and 15 psi. After cooling, the priming water was removed and a sterilized saline solution containing 1 percent human albumin added; the shunt containing the microcapsules and albumin solution was kept sealed for 15 hours at 4°C. The albumin solution is displaced with sterile saline under sterile technique just prior to use, generally within 24 hours.

EXAMPLE 2

In vitro tests

The following batch experiments were effected at 37°C using double coated microencapsulated charcoal prepared as described above.

A. One gram of microcapsules was stirred with 30 ml of a solution containing 21 mg percent of creatinine. The creatinine concentration dropped at a rapid rate; 50 percent was removed within 12 minutes.

B. Thirty grams of microcapsules was stirred with 9 l of a solution containing 11 mg percent of uric acid; 50 percent of the uric acid present was removed within 18 minutes.

C. In a single pass experiment, a solution containing 20 mg percent of creatinine was passed through 300 g of microcapsules. The creatinine clearance rate was 150 ml/min. at a flow rate of 200 ml/min.

EXAMPLE 3

In vivo tests

The silicone-coated polypropylene extracorporeal shunt utilized consisted essentially of a cylinder 8 cm high and 10 cm in diameter. The cylinder was equipped with screens and inlet and outlet ports for connection via sterile tubing to arterial and venous circulation; the efferent circuit contained air and clot traps. The priming volume of the shunt was 300 ml. Further details of the shunt are given by Chang et al., Trans. Amer. Soc. Artif. Intern. Organs, 14, 163–158 (1968).

The following experiments were carried out in mongrel dogs weighing between 20 and 27 kg, under pentobarbital anesthesia. Systemic heparinization (1 mg/kg of heparin sodium by vein and 2 mg/kg into the shunt) was used for the studies on platelets. Arterial platelet counts varied by no more than ± 4 percent over 2–4 hours. After 2 hours, during which control blood samples were drawn, each dog was connected for 2 hours to the extracorporeal shunt chamber by its femoral artery and vein. The mean flow rate was 120 ml/min (± S.D. 10 ml). For the studies on creatinine removal, creatinine (45–70 mg/kg) was infused intravenously into each acutely nephrectomized animal to obtain an arterial blood creatinine level in the range of 10 to 30 percent. This level became steady within 2 hours after infusion and remained so within ± 2.5 mg percent for a further 2 hours in control experiments. Two hours after infusion, each dog was connected to the shunt chamber with regional heparinization to prevent clotting. The mean flow rate was also 120 ml/min (± S.D. 10 ml).

The decrease in arterial creatinine level after two hours of hemoperfusion with activated charcoal or microencapsulated charcoal was about 35 percent. The decrease was most rapid in the first half hour; the rate with microencapsulated charcoal was only slightly lower than that obtained with free charcoal. In addition, the pentobarbital anesthetic was cleared at 84 –50 ml/min.

The effects of 2 hours of hemoperfusion with activated charcoal and the same activated charcoal microencapsulated with collodion, heparin-complexed collodion and albumin-coated collodion are tabulated below:

| Treatment | No. of Dogs | Arterial creatinine level (% of control) mean ± S.D. |
|---|---|---|
| Activated charcoal | 3 | 55±14 |
| Microencapsulated activated charcoal Collodion | 4 | 59±10 |
| Heparin-complexed collodion | 3 | 84±9 |
| Albumin-coated collodion | 9 | 63±7 |

Activated charcoal was effective in lowering arterial creatinine, but it caused a serious fall in the arterial platelet level. Activated charcoal coated with hepatin-complexed collodion did not alter the platelet level significantly, but it was much less efficient in removing blood creatinine. Collodion-microencapsulated charcoal, prepared to have very thin membranes, removed creatinine from the blood almost as efficiently as free activated charcoal, but there was also a serious decrease in the platelet level. On the other hand, albumin-coated collodion microcapsules caused no significant fall in the platelet level, and they were nearly as efficient as collodion-coated charcoal microcapsules or free charcoal in lowering blood creatinine.

Further experiments in five dogs confirmed the in vitro findings that uric acid was also efficiently removed. These experiments also confirmed that very little urea and essentially no calcium ion, phosphate, plasma albumin or other blood protein is removed using the present system. In the absence of a suitable absorbent for the removal of urea, that compound has been removed using microencapsulated urease in conjunction with an absorbent for ammonia such as microencapsulated charcoal. Microencapsulated ion exchange and/or chelating resins have been used for selective ion removal.

Plasma hemoglobin measurements indicated that neither free nor microencapsulated charcoal caused any hemolysis of perfusing blood. The present system requires heparinization but it appears that the albumin-coated microcapsules can be made nonthrombogenic by incorporating hepatin into the outer albumin layer.

Unlike uncapsulated charcoal, no charcoal powder was found in smears of effluent blood from shunts containing microencapsulated charcoal. Histological sections of lungs after two hours of hemoperfusion through 300 g of albumin-coated microencapsulated activated charcoal indicated no emboli in three dogs treated with preparations which has not been autoclaved. Only four very small charcoal particles were found in precapillary vessels of the fourth dog treated with autoclaved microencapsulated charcoal. With more careful washing of the autoclaved preparations, no charcoal particles were found in histological sections on three subsequently treated dogs. Histological sections of liver, spleen, and kidney obtained from the four treated dogs showed no evidence of charcoal embolism.

In comparative series of experiments, four control pentobarbital anesthetized dogs underwent percutaneous femoral artery catheterization (14 gauge catheter). Seven pentobarbital anesthetized dogs underwent similar percutaneous arterial catheterization followed by two hours of hemoperfusion through 300 g of sterile albumin-coated microencapsulated activated charcoal. All animals were followed for more than a month and no adverse effects were observed.

EXAMPLE 4

Clinical trial.

B. B. is a 50 year old white male with chronic lung disease. The patient could not be accommodated in either a chronic hemadialysis of rental transplantation program and has been maintained by peritoneal dialysis. On the day of clinical trial, his biochemical data were as follows: BUN 102 mg percent, creatinine 16.5 percent, uric acid 12.9 mg percent, sodium 143 meg/l, chloride 98 meg/l, potassium 4.4 meg/l, calcium 7.4 mg percent, and phosphorous 6.4 mg percent.

The procedure of hemoperfusion was the same as in the in vivo experiments. The extracorporeal shunt chamber containing 300 g of albumin-coated collodion microencapsulated activated charcoal was used. After percutaneous puncture of the left femoral artery (14 gauge catheter), 3,000 USP units of heparin was injected into the shunt and 5,000 USP units intravenously into the patient. Blood from left femoral artery entered the shunt to displace the 350 cc. saline priming solution. After discarding the 350 cc. priming solution, the effluent flow from the shunt was returned to the patient by the cephalic vein (14 gauge catheter). No blood pump was used and a shunt blood flow of 100 ml/min was maintained. At the beginning of the hemoperfusion procedure, the patient stated that there was a smell of ether. It was found that this came from a trace amount of residual ether present in the collodion membranes. This smell disappeared shortly. The patient felt well throughout the 90 minute procedure. No other side effects were noted. Instead of nausea and vomiting charcoal encountered by some patients treated with free activated charcoal hemoperfusion, the patient started to feel very hungry half-way through the procedure and asked repeatedly for food. The patient accepted this procedure so completely that immediately after the procedure, he agreed to have repeated hemoperfusion in the future. The patient was followed for 48 hours with no adverse effects and was discharged from the hospital.

Biochemical data from the hospital laboratory showed that in 60 minutes of hemoperfusion, plasma creatinine fell from the preperfusion level of 16.5 to 14.8 mg percent, and uric acid from 12.9 to 9 mg percent. Hematological and biochemical data showed that 90 minutes of hemoperfusion did not result in any significant adverse effects on platelets, neither leukocytosis nor leukopenia were noted; and there was no significant increase in plasma hemoglobin level. The clearance/shunt blood flow ratio was 0.55 after 15 minutes and 0.40 after 60 minutes for creatinine; and 0.65 after 15 minutes and 0.55 after 60 minutes for uric acid.

In other trials on patients at a blood flow rate of 200 min/min, the clearance for creatinine was 160 ml/min after 15 minutes and 110 ml/min after two hours. The clearance for uric acid was 170 ml/min after 15 minutes and 135 ml/min after 2 hours. These values are much higher than the standard artificial kidneys being used clinically. No adverse effects on platelets or other formed elements of blood was observed; nor were there any embolisms of charcoal particles.

Other variations in the making and using of double coated microcapsules will suggest themselves to those skilled in the art and my invention is as claimed.

I claim:

1. A microencapsulated detoxicant composition adapted for reaction in an extracorporeal shunt with waste metabolites and toxins found in blood comprising a solid detoxicant coated first with a semipermeable polymer membrane having an effective pore size permitting waste metabolites and toxins to diffuse therethrough and second with a permeable outer layer of a blood compatible protein.

2. A composition according to claim 1 wherein the solid detoxicant is charcoal.

3. A composition according to claim 2 wherein the semipermeable polymer membrane is collodion.

4. A method for making a microencapsulated detoxicant composition adapted for reaction in an extracorporeal shunt with waste metabolites and toxins found in blood which comprises coating a solid detoxicant with a semipermeable polymer membrane having an effective pore size permitting waste metabolites and toxins to diffuse therethrough and then coating with a permeable outer layer of a blood compatible protein.

* * * * *